US007786447B2

(12) United States Patent
Kondo et al.

(10) Patent No.: US 7,786,447 B2

(45) Date of Patent: Aug. 31, 2010

(54) SCINTILLATOR PANEL, METHOD OF MANUFACTURING THE SAME AND RADIATION IMAGING APPARATUS

(75) Inventors: Masashi Kondo, Hachioji (JP); Takehiko Shoji, Hachioji (JP); Mitsuru Sekiguchi, Tokyo (JP)

(73) Assignee: Konica Minolta Medical & Graphic, Inc., Tokyo (JP)

( * ) Notice: Subject to any disclaimer, the term of this patent is extended or adjusted under 35 U.S.C. 154(b) by 0 days.

(21) Appl. No.: 11/942,365

(22) Filed: Nov. 19, 2007

(65) Prior Publication Data

US 2008/0116381 A1 May 22, 2008

(30) Foreign Application Priority Data

Nov. 22, 2006 (JP) ............................ 2006-315367

(51) Int. Cl.
*G01T 1/20* (2006.01)

(52) U.S. Cl. ................................................ 250/370.11

(58) Field of Classification Search ............. 250/370.11
See application file for complete search history.

(56) References Cited

U.S. PATENT DOCUMENTS

| | | | | |
|---|---|---|---|---|
| 5,427,817 | A * | 6/1995 | Goodman et al. | 427/65 |
| 2004/0219289 | A1 * | 11/2004 | Lamotte et al. | 427/69 |

FOREIGN PATENT DOCUMENTS

| | | | |
|---|---|---|---|
| EP | 1607768 | A1 * | 12/2005 |
| JP | A 2003-75542 | | 12/2003 |

* cited by examiner

*Primary Examiner*—David P Porta
*Assistant Examiner*—Shun Lee
(74) *Attorney, Agent, or Firm*—Finnegan, Henderson, Farabow, Garrett & Dunner, L.L.P.

(57) ABSTRACT

A scintillator panel comprising: a radiation-transparent substrate; and a phosphor layer provided on the substrate, the phosphor layer emitting light when irradiated with a radiation, wherein at least one edge of the substrate and at least one edge of the phosphor layer are arranged on a same plane.

4 Claims, 5 Drawing Sheets

COMPARATIVE EXAMPLE 1

COMPARATIVE EXAMPLE 2

INVENTIVE EXAMPLES 1, 2

INVENTIVE EXAMPLES 3,4

SCINTILLATOR PANEL, METHOD OF MANUFACTURING THE SAME AND RADIATION IMAGING APPARATUS

This application is based on Japanese Patent Application No. 2006-315367 filed on Nov. 22, 2006 in Japanese Patent Office, the entire content of which is hereby incorporated by reference.

FIELD OF THE INVENTION

The present invention relates to a scintillator panel used for medical or industrial radiation imaging, a method of manufacturing the scintillator panel and a radiation imaging apparatus.

BACKGROUND OF THE INVENTION

Hitherto, recording apparatus for radiation image such as X-ray image is widely applied for diagnosis on medical scenes. Particularly, radiation imaging apparatus using intensifying paper-x-ray film system is used on the medical scenes in the world as a result of the improvement in the sensitivity and image quality during the long history thereof.

Recently, a digital radiation image detecting means typically a flat panel radiation detector (FPD) has come to be used in this field, by which the radiation image can be obtained as digital information which can be freely processed and immediately transmitted electrically.

The radiation image detecting means has a scintillator panel which converts radiation to fluorescence. The scintillator panel receives radiation permeated through an object and instantaneously emits light corresponding to intensity of the radiation from a phosphor layer (fluorescent layer): the scintillator panel containing a phosphor layer formed on a substrate.

FIG. 6 is a schematic cross section of the panel portion of a vacuum evaporation apparatus for manufacturing the scintillator panel disclosed in patent Document 1.

The scintillator panel 109 is constituted by a phosphor layer 107, a substrate 101 supporting the phosphor layer 107, a insulation layer 102, a reflection layer 103 for reflecting the light converted by the phosphor layer to the sensor panel side. 104 is a substrate holder, 105 is a masking area for spattering aluminum of the reflection layer 103.

In the scintillator panel and the production method of scintillator panel described in patent Publication 1, a non-image forming area where the phosphor layer 107 is not formed is formed at the circumference portion of the substrate 101 because the substrate 101 is held by the substrate holder at the circumference portion thereof on the occasion of formation of the phosphor layer 107 on the substrate 101 by the vacuum evaporation apparatus as shown in the cross section of the scintillator panel of FIG. 6.

In the field of radiation imaging such as mammography, it is desired to have an expanded effective image area of the radiation detecting means.

Patent Document 1: Japanese Patent Application Publication Open to Public Inspection (hereafter referred to as JP-A) No. 2003-75542

SUMMARY OF THE INVENTION

An object of the present invention is to provide a scintillator panel having an enlarged effective imaging area by uniformly forming a phosphor layer even at the peripheral of the scintillator panel, a method of manufacturing the same and a radiation imaging apparatus employing the scintillator panel.

One of the aspects of the present invention is a scintillator panel comprising: a radiation-transparent substrate; and a phosphor layer provided on the substrate, the phosphor layer emitting light when irradiated with a radiation, wherein at least one edge of the substrate and at least one edge of the phosphor layer are arranged on a same plane.

DESCRIPTION OF THE PREFERRED EMBODIMENTS

The above object of the present invention is achieved by the following structures.

(1) A scintillator panel comprising:

a radiation-transparent substrate; and a phosphor layer provided on the substrate, the phosphor layer emitting light when irradiated with a radiation, wherein at least one edge of the substrate and at least one edge of the phosphor layer are arranged on a same plane.

(2) The scintillator panel of Item (1), wherein the substrate and the phosphor layer each have an edge surface perpendicular to a top surface of the substrate.

(3) A method of manufacturing a scintillator panel comprising the steps of:

forming a phosphor layer on a radiation-transparent substrate to prepare a scintillator panel, the phosphor layer emitting light when irradiated with a radiation; and processing the substrate and the phosphor layer formed on the substrate so that an edge of the substrate and an edge of the phosphor layer are arranged on the same plane.

(4) The method of Item (3), wherein the step of processing the substrate and the phosphor layer includes cutting the substrate and the phosphor layer.

(5) A radiation imaging apparatus comprising a radiation detecting means comprising the scintillator panel of Item (1) and a photoelectric conversion means laminated on the scintillator panel.

(6) The radiation imaging apparatus of Item (5), wherein an edge of the scintillator panel is aligned with an edge of an effective imaging area of the photoelectric conversion means.

The following effects can be obtained by the scintillator panel for radiography of the present invention, the manufacturing method of the scintillator panel and the radiation imaging apparatus of the present invention.

1. A scintillator panel can be provided, by which the effective image area is expanded by effectively utilizing the effective image area of the scintillator panel.

2. The phosphor layer is uniformly formed even at the peripheral portion by preventing the ununiformity of the phosphor layer due to undesired deposition of phosphor at the peripheral on the occasion of the vacuum evaporation.

3. The detection of radiation by the radiation detecting apparatus even at the peripheral portion can be made possible.

The embodiment of the present invention will be described in detail below referring drawings, however, the present invention is not limited to the described embodiments.

Figure 1:
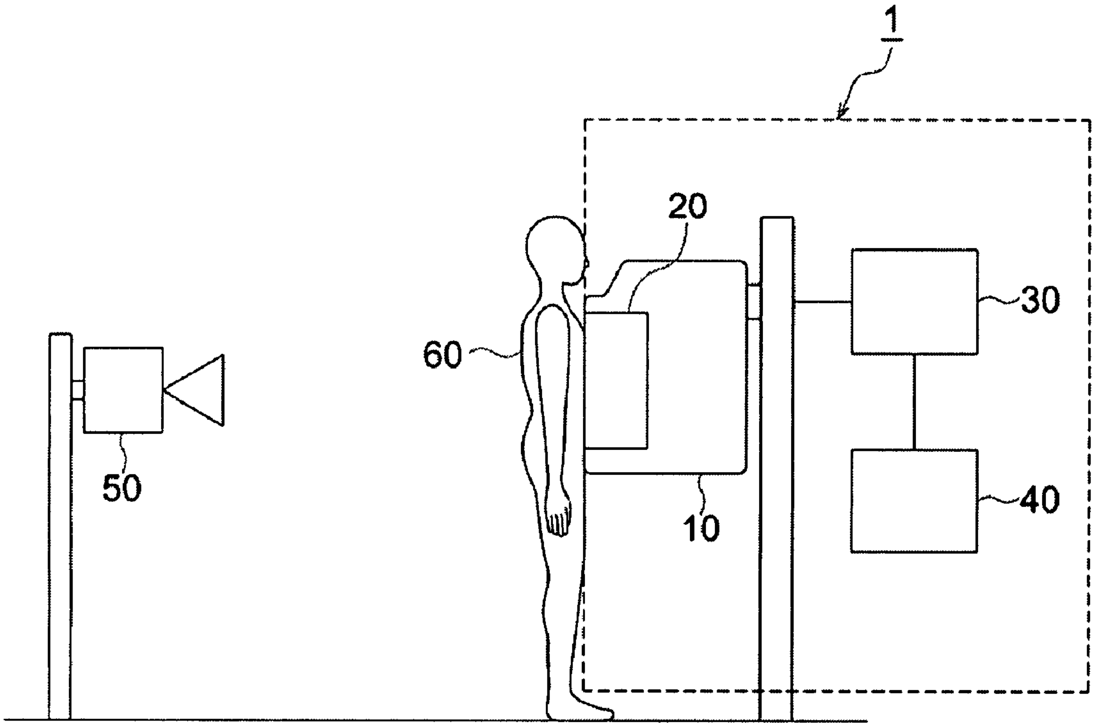
FIG. 1 shows a schematic drawing of a radiation imaging apparatus according to an embodiment of the present invention.

FIG. 1 is a schematic drawing of a radiation imaging apparatus according to the present invention.

A radiation imaging apparatus 1 has a main body 10, a radiation detecting means 20, an image processing means 30 and an image displaying means 40. The main body 10 in which the radiation detecting means 20 and various apparatus are installed is fixed at a designated position in a radiation imaging room.

The radiation imaging is carried out by the radiation detecting means 20 by detecting the radiation emitted from a radiation source 50 and permeated through an object 60 and a front panel 22 of the radiation detecting means 20.

Figure 2:
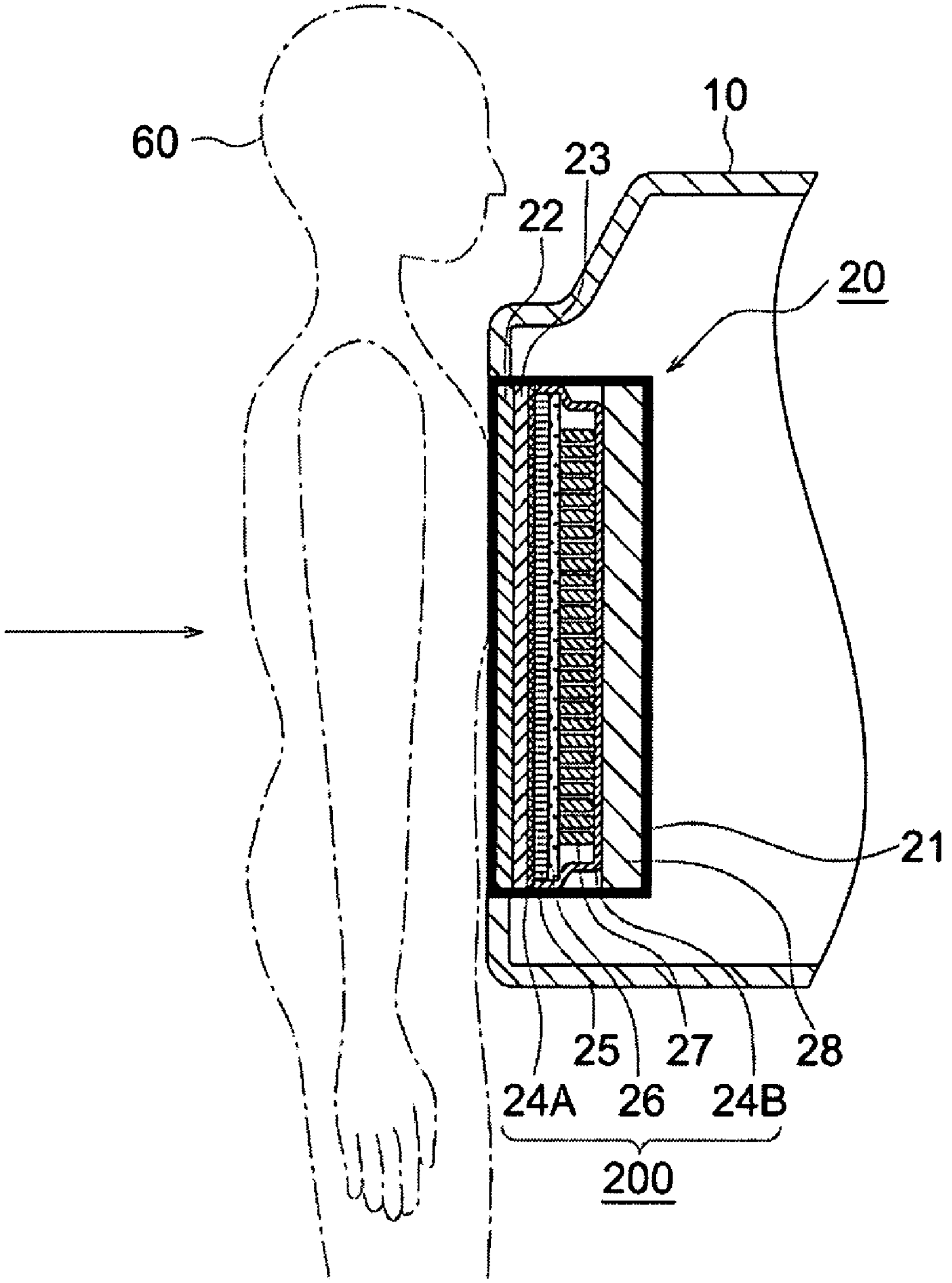
FIG. 2 shows the enlarged cross section of a part of FIG. 1.

FIG. 2 shows a partially enlarged cross section of FIG. 1.

The radiation detecting means 20 contains the front panel 22, a cushion material 23, a scintillator panel 200 and a phosphor layer (scintillator layer) 27 in a housing 21 thereof.

The scintillator panel 200 has a substrate 25 provided thereon a reflection layer 26 and a phosphor layer 27 formed on the reflection layer 26. The phosphor layer 27 absorbs energy of incident radiation and emits electromagnetic waves having wavelengths of 300 μm to 800 μm, namely, electromagnetic waves principally composed of visible light and extending over ultra violet ray to infrared ray when the phosphor layer 27 is irradiated with radiation.

The scintillator panel 200 is constituted by the substrate 25, reflection layer 26, phosphor layer 27 and moisture resistive protection layers 24A and 24B, hereinafter referred to as protection layer, for enclosing and sealing the above members.

The main body 10 is produced by a material with high rigidity such as carbon fiber-strengthen resin for protecting the various members installed therein.

The front panel 22 of the radiation detecting means 20 is made from a material with high radiation transmittance. The thickness of the front panel 22 is from 0.3 to 0.5 mm so as to hold the strength while keeping the radiation transmittance. Examples of the material having high radiation transmittance and high rigidity include an aluminum alloy, a carbon fiber-strengthen resin, an acryl resin, a phenol resin, a polyimide resin and a composite material of the resin and the aluminum alloy.

The front panel 22 presses the scintillator panel 200 through the cushion material 23 so as to make good contact the scintillator panel 200 to the photoelectric conversion means (photoreceptive element) 28.

The protection films 24A and 24B are formed into a bag by adhering after enveloping the substrate 25, reflection layer 26 and phosphor layer 27. The moisture permeation rate of the protection films 24A and 24B is not more than 50 $g/m^2$ per day.

The substrate 25 is a plate or film capable of carrying the reflection layer 26 and is one capable of permeating 10% or more of incident radiation such as X-ray.

As the substrate 25, various kinds of glass, polymer material and metal can be used. Examples of usable material include: a plate of glass such as borosilicate glass and chemically strengthen glass; a ceramic substrate such as sapphire, silicon nitride and silicon carbide; a semiconductor substrate such as silicon, germanium, gallium-arsenic, gallium-phosphor and gallium-nitrogen; a plastic film such as a cellulose acetate film, a polyester film, a polyethylene terephthalate film, a polyamide film, a polyimide film, a triacetate film, a polycarbonate film and a carbon fiber-strengthen resin sheet; a metal sheet such as an aluminum sheet, an iron sheet and a copper sheet; and a metal sheet covered with a metal oxide layer. The thickness of the substrate 25 is preferably 0.05 mm-3 mm.

Among the above-described materials, the aluminum sheet, carbon fiber-strengthen resin sheet and polyimide sheet are preferably used from the viewpoint of durability and lightness.

When the scintillator panel 200 is irradiated with radiation from the substrate 25 side to the phosphor layer 27 side, energy of the radiation is absorbed by the phosphor material in the phosphor layer and electromagnetic wave (light) is immediately emitted from the phosphor layer 27 corresponding to the intensity of the incidental radiation.

A part of the emitted electromagnetic wave reaches to the surface of the phosphor layer 27 (electromagnetic wave emitting surface), however, some part of the emitted electromagnetic wave proceeds toward the substrate 25.

The reflection layer 26 of to the present invention is a layer capable of reflecting the electromagnetic wave proceeds toward the substrate 25.

A metal thin layer is preferably used as the reflection layer 26. As the metal thin layer, a layer composed of a substance selected from the group of Al, Ag, Cr, Cu, Ni, Ti, Mg, Rh, Pt and Au is preferably used. Two or more metal layers may be formed, for example, a Cr layer on which an Au layer is formed.

In the present invention, it is a preferable embodiment that a layer containing aluminum is used as the reflection layer 26.

The phosphor layer is a layer containing a phosphor layer for a radiation capable of emitting fluorescence when irradiated with radiation.

Cesium iodide (CsI) is preferably used for the phosphor layer in the present invention. Cesium iodide exhibits a higher conversion ratio from radiation to visible light, and, since the phosphor material can easily be formed into columnar crystals by vacuum evaporation, the thickness of the phosphor layer 27 can be made thicker due to the light-guiding effect in the columnar crystals in which scattering of emitted light is suppressed.

Various activators are added since the light emitting efficiency is low when only CsI is used. For example, a mixture of CsI and sodium iodide (NaI) in an arbitrary ratio described in JP-A No. 54-35060 is usable.

Recently, an X-ray phosphor manufacturing method is proposed as disclosed in JP-A No. 2001-59899 in which an activation substance such as indium (In), thallium (Tl), lithium (Li), potassium (K), Rubidium (Rb) and sodium (Na) is sputtered on CsI formed by vacuum evaporation.

The CsI as the basic phosphor material may be replaced with CsBr or CsCl. Moreover, the phosphor layer 27 may be one constituted by crystals formed on the base of the mixed crystals of at least two of CsI, CsBr and CsCl in an arbitrary ratio.

The phosphor layer of the present invention may be formed by any method known in the art, however, it is preferably formed via a vapor deposition method.

Figure 3:
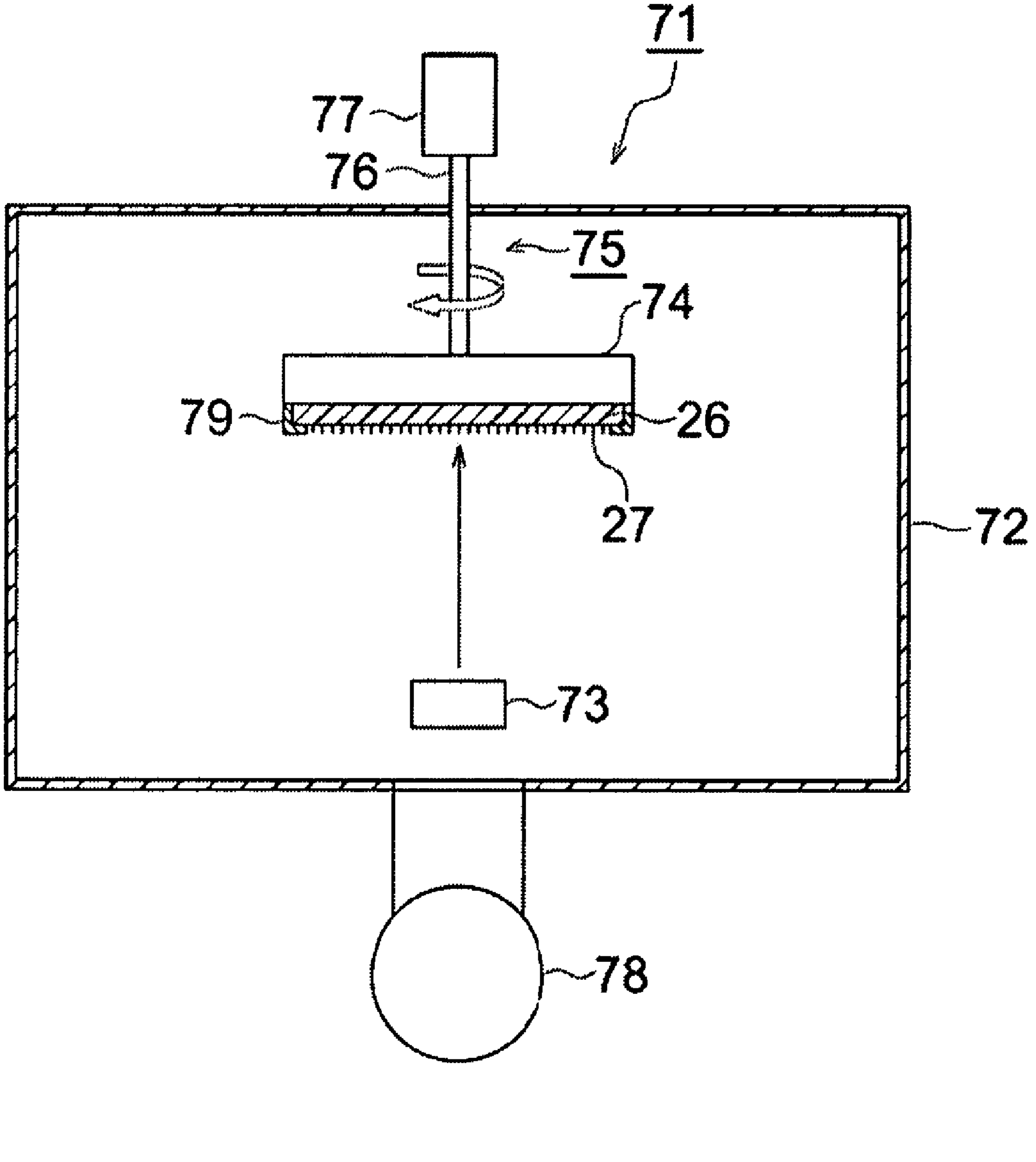
FIG. 3 shows a schematic drawing of a vacuum evaporation apparatus for forming the phosphor layer FIGS. 4(*a*) to 4(*e*) show a schematic cross section and enlarged partial cross sections of a radiation detecting means containing a substrate of a scintillator panel, a phosphor layer and a photoelectric conversion means.

FIG. 3 shows a schematic drawing of the constitution of a vacuum evaporation apparatus for forming the phosphor layer 27.

The vacuum evaporation apparatus 71 has a box-shaped vacuum chamber 72 in which an evaporation boat 73 is placed. The boat 73 in which the evaporation source is charged is provided with a resistance heater. The resistance heater generates Joule heat when electric current is applied to the heater. As the boat 73, an alumina crucible wound with a resistance heater is used.

In the vacuum chamber 72, a holder 74 for holding the substrate 25 is arranged just above the boat 73. A rotation mechanism 75 for rotating the holder 74 is attached to the holder 74. The rotation mechanism is constituted by a rotation axis 76 connected to the holder 74 and a motor 77 as a driving source. The rotation axis 76 is rotated by driving by the motor 77 so that the holder 74 is rotated while facing to the boat 73. In FIG. 3, 79 represents a substrate, holding member.

A vacuum pump 78 is connected to the vacuum chamber 72. Evacuation of the vacuum chamber 72 and introducing an inert gas into the vacuum chamber 72 are carried out by the vacuum pump 78.

EXAMPLES

The present invention will be described below referring examples, however, the present invention is not limited thereto.

(Preparation of Reflection Layer)

A reflection layer 26 having a thickness of 0.01 μm was formed by sputtering aluminum on a polyimide film having a thickness of 125 μm (Upilex-125S manufactured by Ube Industries Ltd) to obtain a substrate 25.

(Formation of Phosphor Layer)

The substrate 25 was attached onto the holder 74 by a holding member 79 and raw material of phosphor layer (CsI: 0.003Tl) was charged into the boat 73. Then the vacuum pump 78 was driven to evacuate air in the vacuum chamber 72 and then inert gas was introduced into the vacuum chamber 72 so as to make the vacuum degree in the vacuum chamber 72 to 0.5 Pa.

On the occasion of the formation of the vacuum atmosphere, the heater of the holder 74 and the motor 77 of the rotation mechanism were turned on so that the substrate 25 attached on the holder 74 was heated and rotated while facing to the boat 73. The rotation rate of the holder 74 was 10 rpm and the distance between the holder 47 and the boat 73 was adjusted to 400 mm.

The temperature of the substrate 25 was maintained at 200° C. by a heating member, not shown in the drawing, provided in the vacuum evaporation apparatus. Then the crucible was heated by the resistance heater for depositing the phosphor substance on the substrate until the thickness of the phosphor layer was grown to 500 μm. Thus desired phosphor layer 27 was formed on the substrate 25 to obtain a scintillator panel.

When the phosphor layer 27 composed of innumerable columnar crystals is formed on the surface of the substrate 25 by the vacuum evaporation apparatus 71, the substrate 25 having a thickness of not more than 0.4 mm is deformed by radiant heat to cause ununiformity in the height at the circumference portion of the phosphor layer 27.

Figure 4:
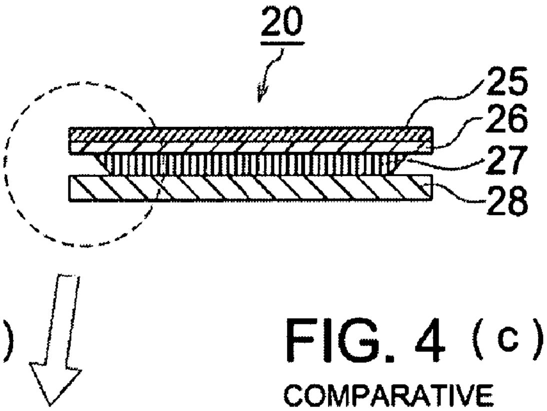
Figure 4:
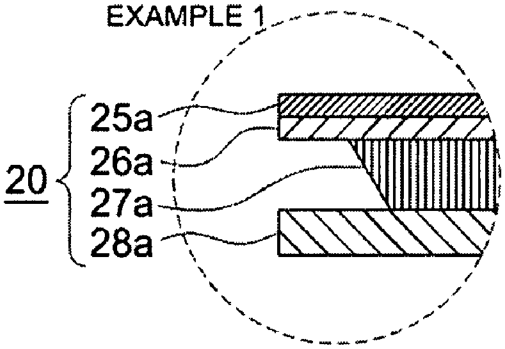
Figure 4:
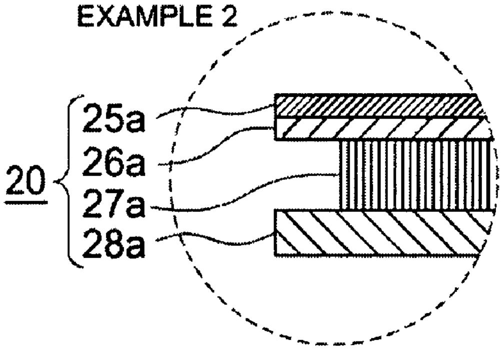
Figure 4:
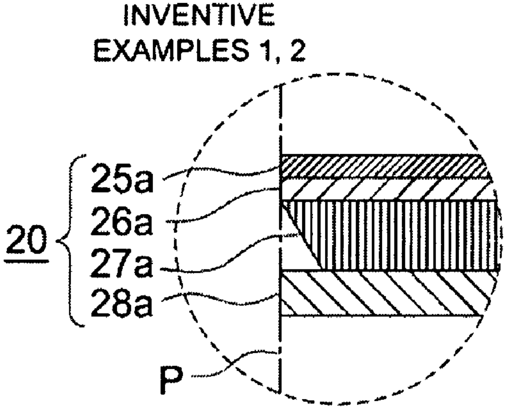
Figure 4:
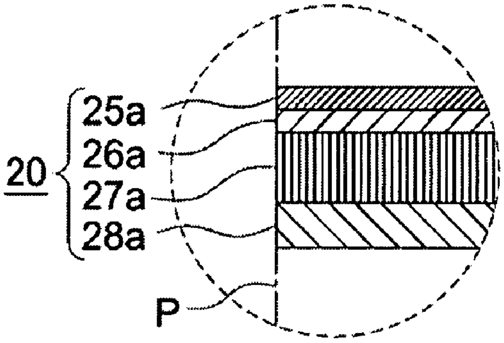

FIG. 4(*a*) shows a schematic cross section of an usual radiation detecting means 20 composed of the substrate 25 of the scintillator panel 200, the phosphor layer 27 and photoelectric conversion means (photoreceptive element) 28.

FIG. 4(*b*) shows an enlarged partial cross section of the radiation detecting means 20 of Comparative Example 1.

Figure 6:
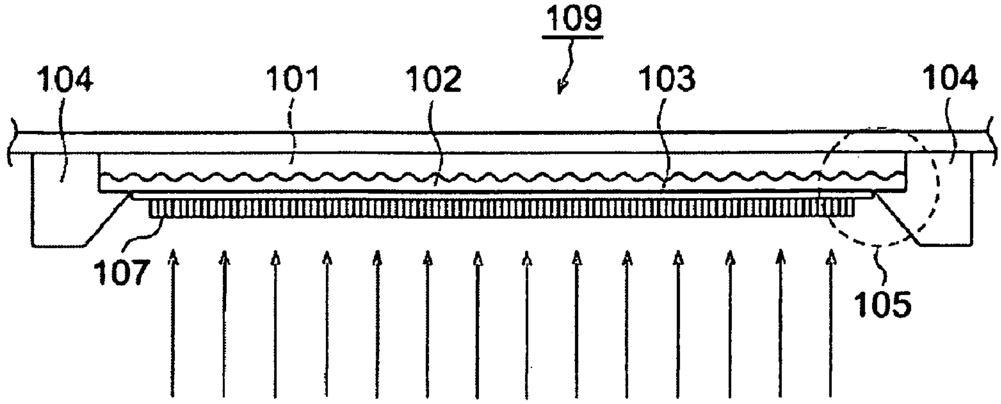
BACKGROUND ART FIG. 6
FIG. 6 shows a schematic cross section of the panel portion of a vacuum evaporation apparatus for manufacturing the scintillator panel disclosed in patent Document 1.

FIG. 4(*c*) shows an enlarged partial cross section of the radiation detecting means 20 of Comparative Example 2. As shown in FIG. 6, a non-image area is caused by the substrate holder 104 at the circumference portion so as to reduce effective image area.

Figure 5:
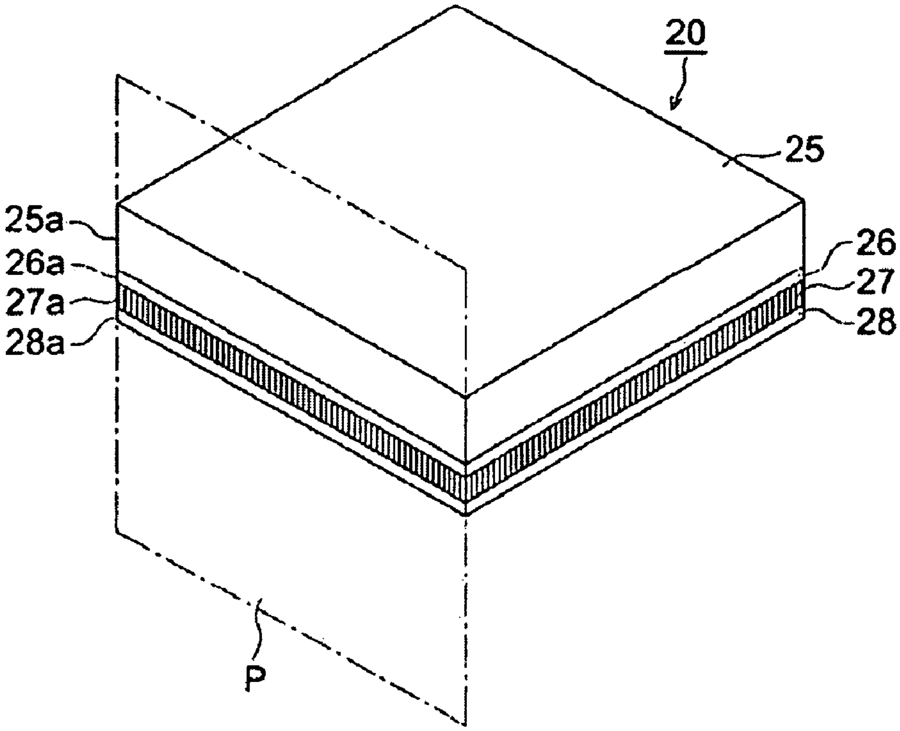
FIG. 5 shows a perspective view of a radiation detecting means.

FIG. 4(*d*) shows an enlarged partial cross section of the radiation detecting means 20 of the Inventive Examples 1 and 2. FIG. 4(*e*) shows an enlarged partial cross section of the radiation detecting means 20 of the Inventive Examples 3 and 4. FIG. 5 shows an oblique view of the radiation detecting means 20.

The radiation detecting means of the present invention 20 is constituted so that at least one edge of the substrate 25, at least one edge of the phosphor layer 27 and at least edge of the photoelectric conversion means 28 are arranged on the same plane P.

Therefore, the edge surface 25*a* of the substrate 25 and the edge surface 27*a* of the phosphor layer 27 are arranged on the plane P which is an extended plane of the edge surface 28*a* of the photoelectric conversion means 28.

In the radiation detecting means 20 shown in FIGS. 4(*d*) and 4(*e*), the vertical edge surfaces of the substrate 25, phosphor layer 27 and the photoelectric conversion means 28 are arranged on the same plane by cutting the peripheral portions of the substrate 25 and the photoelectric conversion means 28 by a cutting means which is not shown in the drawing. As the cutting means, a high frequency wave cutting means, a laser cutting means and a diamond cutting means are applicable.

In the Inventive Examples 1 and 2 shown in FIG. 4(*d*), the edge of the phosphor layer 27 is arranged on the same plane together with the edge of the substrate 25 and that of the photoelectrical conversion means 28 while the oblique edge surface of the peripheral of the phosphor layer was unchanged.

In Inventive Examples 3 and 4 shown in FIG. 4(*e*), the edge surface of the phosphor layer 27 was arranged on the same plane together with the cut edges of the substrate 25 and the photoelectrical conversion means 28.

<Evaluation>

Each of the obtained scintillator panel was set on the CMOS flat panel (X-ray CMOS camera system Shad-o-Box4KEV by Rad Icon Co., Ltd.) to obtain a radiation imaging apparatus. Then, the radiation imaging apparatus was irradiated with X-rays generated at a tube voltage of 70 kVp from the scintillator panel side of the radiation imaging apparatus to obtain a radiation image. In the obtained radiation image, an area exhibiting 80% or more of signal intensity based on the average signal intensity over the whole image area was determined and designated as an effective image area. The effective image area obtained for each of the Comparative Example 2 and Inventive Examples 1-4 was expressed by a relative value when the effective image area obtained for Comparative Example 1 was set to 1.0.

The criteria for the evaluation of the effective image area were as follows:

A: The effective image area was larger than 1.07 and not larger than 1.10.

B: The effective image area was larger than 1.04 and not larger than 1.07.

C: The effective image area was larger than 1.02 and not larger than 1.04.

D: The effective image area was larger than 1.01 and not larger than 1.02.

E: The effective image area was larger than 1.00 and not larger than 1.01.

F: The effective image area was not larger than 1.00.

TABLE 1

| | *1 | Shape of edge of phosphor layer | Effective image area |
|---|---|---|---|
| Comparative Example 1 | 0 | Oblique edge surface | F |
| Comparative Example 2 | 0 | Vertical edge surface | E |
| Inventive Example 1 | 1 | Oblique edge surface | C |
| Inventive Example 2 | 4 | Oblique edge surface | C |
| Inventive Example 3 | 1 | Vertical edge surface | B |
| Inventive Example 4 | 4 | Vertical edge surface | A |

*1 Number of the edge(s) of the scintillator panel where the edge of the substrate 25 and the edge of the phosphor layer 27 were arranged on the same plane.

Table 1 shows the results of evaluation on the effective image area in terms of the difference in edges of the substrate 25 and the phosphor layer 27, and the shape of the edge of the phosphor layer 27.

In Comparative Examples 1 and 2, the effective image area was reduced and the image at the peripheral portion was degraded. In Inventive Examples 1 and 2, the effective image areas were larger than those in the Comparative Examples 1 and 2, and the effective image area in Inventive Example 3 was still larger than those in Inventive Examples 1 and 2. In Inventive Example 4, the effective image area was further increased than that in Inventive Example 3 by increasing the number of the edge(s) of the scintillator panel where the edge of the substrate 25 and the edge of the phosphor layer 27 were arranged on the same plane 1 to 4.

What is claimed is:

1. A method of manufacturing a scintillator panel comprising a phosphor layer having cesium iodide provided on a resin film substrate comprising a polyimide film, further comprising the steps of:

forming a phosphor layer on a radiation-transparent substrate by a vapor evaporation process with a rotation mechanism, and cutting the substrate and the phosphor layer formed on the substrate so as to arrange at least one edge of the substrate and at least one edge of the phosphor layer on a same plane.

2. The method of manufacturing a scintillator panel of claim 1 comprising said cutting step, wherein the substrate and the phosphor layer each have an edge surface perpendicular to a top surface of the substrate.

3. The method of manufacturing a scintillator panel of claim 1, wherein a thickness of the substrate is 50 μm or more.

4. A method of manufacturing a radiation imaging apparatus comprising a step of:

laminating a photoelectric conversion means on the scintillator panel manufactured by claim 1 by aligning an edge of the scintillator panel with an edge of an effective imaging area of the photoelectric conversion means.

* * * * *